US009404745B2

(12) United States Patent
Seki

(10) Patent No.: US 9,404,745 B2
(45) Date of Patent: Aug. 2, 2016

(54) MEASUREMENT JIG

(71) Applicant: KOMATSU LTD., Minato-ku, Tokyo (JP)

(72) Inventor: Masanobu Seki, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/650,509

(22) PCT Filed: Sep. 19, 2013

(86) PCT No.: PCT/JP2013/075371
§ 371 (c)(1),
(2) Date: Jun. 8, 2015

(87) PCT Pub. No.: WO2015/040726
PCT Pub. Date: Mar. 26, 2015

(65) Prior Publication Data
US 2015/0308826 A1    Oct. 29, 2015

(51) Int. Cl.
G01C 9/02    (2006.01)
G01C 15/06   (2006.01)
E02F 9/26    (2006.01)
E02F 9/28    (2006.01)

(52) U.S. Cl.
CPC ............... *G01C 15/06* (2013.01); *E02F 9/264* (2013.01); *E02F 9/2808* (2013.01)

(58) Field of Classification Search
CPC ........................................................ G01C 15/06
USPC ............................................................ 33/293
See application file for complete search history.

(56) References Cited

U.S. PATENT DOCUMENTS

| 4,875,291 A | 10/1989 | Panique et al. |
| 5,311,222 A | 5/1994 | Buckley et al. |
| 5,368,392 A * | 11/1994 | Hollander ................. G01J 5/02 250/491.1 |
| 5,893,214 A | 4/1999 | Meier et al. |
| 6,043,879 A * | 3/2000 | Dong ................... G01C 15/004 33/291 |
| 2002/0144416 A1 | 10/2002 | Ghesla |
| 2012/0186088 A1* | 7/2012 | Amor ..................... G01C 15/06 33/228 |
| 2012/0272537 A1* | 11/2012 | Nishita ................ G01C 15/008 33/293 |
| 2013/0158788 A1 | 6/2013 | Seki |
| 2014/0373369 A1* | 12/2014 | Bockem .............. G01C 15/002 33/228 |

(Continued)

FOREIGN PATENT DOCUMENTS

| DE | 19602327 | 7/1997 |
| JP | 58182111 A | 10/1983 |
| JP | 58182111 U | 10/1983 |

(Continued)

OTHER PUBLICATIONS

International Search Report mailed Oct. 15, 2013 in corresponding International Application No. PCT/JP2013/075371, including English translation, 4 pages.

(Continued)

*Primary Examiner* — G. Bradley Bennett
(74) *Attorney, Agent, or Firm* — Fish & Richardson P.C.

(57) ABSTRACT

A measurement jig is attached to a target member in a form of a blade edge and is used for measuring a position of the target point in combination with a total station. The measurement jig includes a prism mirror that reflects a projected light from the total station, and an attachment member for attaching the prism mirror to the blade edge, in which a mirror center of the prism mirror is aligned with the target point.

3 Claims, 6 Drawing Sheets

(56) References Cited

U.S. PATENT DOCUMENTS

| | | | | |
|---|---|---|---|---|
| 2015/0052766 | A1* | 2/2015 | Chiba | G01C 15/004 33/299 |
| 2016/0076885 | A1* | 3/2016 | Nishita | G01C 25/005 33/292 |

FOREIGN PATENT DOCUMENTS

| | | |
|---|---|---|
| JP | 63041713 B2 | 8/1988 |
| JP | 63041713 U | 8/1988 |
| JP | 2599431 B2 | 4/1997 |
| JP | 2599431 Y2 | 4/1997 |
| JP | 2001165662 A | 6/2001 |
| JP | 2002310658 A | 10/2002 |
| JP | 2006119005 A | 5/2006 |
| JP | 2008121219 A | 5/2008 |
| JP | 2012202061 A | 10/2012 |
| KR | 20-2009-0009958 U | 10/2009 |

OTHER PUBLICATIONS

Notice of Allowance in corresponding KR Application No. 10-2015-7014698, dated Dec. 11, 2015, 3 pages, with English Translation.

Office Action in corresponding DE Application No. 11 2013 005 525.2, mailed Dec. 7, 2015, 9 pages, with English Translation.

\* cited by examiner

MEASUREMENT JIG

CROSS-REFERENCE TO RELATED APPLICATIONS

This application claims priority to International Application No. PCT/JP2013/075371 filed on Sep. 19, 2013, the contents of which application is incorporated herein by reference in its entirety.

TECHNICAL FIELD

The present invention relates to a measurement jig.

BACKGROUND ART

In recent years, computerized construction has come to be introduced to civil engineering using construction machines, and the like. The "computerized construction" refers to a construction process, in which ICT (Information and Communication Technology) and RTK-GNSS (Real Time Kinematic-Global Navigation Satellite Systems) are used in a construction work (e.g. civil engineering) using construction machines such as a hydraulic excavator, a bulldozer and a motor grader to detect the position of a work point of working equipment mounted on the construction machines, so that the working equipment based on the detected work point can be automatically controlled and/or information on a geometry of the construction site and the work point in the geometry can be displayed on a display device in a cab, thereby efficiently performing the construction work (sometimes referred to simply as "work" hereinafter) and obtaining highly accurate construction results.

In such an computerized construction, the work point of the working equipment is, for instance, a blade edge position of a bucket when the construction machine is a hydraulic excavator. The blade edge position is calculated in a coordinates of designed position based on parameter such as a positional relationship between a GNS antenna and a boom foot pin, a length of each of a boom, an arm, and a bucket, and a stroke length of each of a boom cylinder, an arm cylinder, and a bucket cylinder.

However, when the lengths of the boom, the arm, the bucket and the cylinder for each of the boom, the arm and the bucket are designed values, since there are errors between the actual lengths of each of the components and the designed values due to a dimension tolerance for manufacture and assembly processes, the calculated position coordinates and the actual coordinates of the blade edge position are not necessarily the same, so that the accuracy in detecting the blade edge position is reduced. Accordingly, in order to enhance the detection accuracy of the blade edge position, the parameters used for the calculation have to be calibrated using predetermined calibration values based on position coordinates obtained through an actual position measurement, thereby requiring a calibration process (e.g. position measurement).

As an example of such a calibration process, it is known to provide a total station at a position several meters away from a boom foot pin and the position of a measurement point defined near a blade edge of a bucket is measured using the total station (see, for instance, Patent Literature 1). In the calibration process disclosed in Patent Literature 1, the blade edge of the bucket is positioned at a plurality of measurement positions including a ground surface position and a position above the ground surface by a predetermined height, and the position of the measurement point is measured at each of the plurality of measurement positions. Then, the calibration values of the parameters are calculated based on the position coordinates of the plurality of measurement points.

A prism mirror (sometimes referred to simply as a "prism" hereinafter) is attached near a blade edge to measure the blade edge position. Specifically, a laser beam is radiated from the total station to the prism and a light reflected from the prism is measured.

CITATION LIST

Patent Literature(s)

Patent Literature 1 JP-A-2012-202061

SUMMARY OF THE INVENTION

Problem(s) to be Solved by the Invention

A conventional prism is designed to be attached to a pin pole frequently used in a survey work, where a mirror center (the vertex of the prism) collimated by the total station is deviated from the position of the measurement point to be measured (in other words, the measurement point is offset relative to the mirror center). Accordingly, in order to accurately calculate the calibration values, the positional relationship between the mirror center and the measurement point collimated by the total station (i.e. an offset amount) has to be kept constant at each of the measurement positions.

However, in order to keep the offset amount constant at each of the measurement positions, a light projected from the total station has to be normally incident on the prism. Accordingly, the prism has to be moved to squarely face the total station at each of the measurement positions, thereby requiring much care and time for adjusting the posture of the prism. Especially, when the blade edge of the bucket is positioned at a high level and the prism is located at a measurement position unreachable by a worker, the worker has to move up to a high place with the use of a stepladder and the like, thereby causing further trouble.

An object of the invention is to provide a measurement jig capable of facilitating a position measurement using a total station.

Means for Solving the Problem(s)

A measurement jig according to an aspect of the invention is attached to a target member, the measurement jig being used in combination with a total station to measure a position of a target point, the measurement jig including: a prism mirror that is configured to reflect a projected light from the total station; and an attachment member that is configured to attach the prism mirror to the target member, a mirror center of the prism mirror being aligned with the target point.

Herein, the phrase "attach the prism mirror to the target member" means that the prism mirror is attached to the target member without supporting the prism mirror and the attachment member by a person (e.g. a worker).

With the above aspect of the invention, since the mirror center of the prism mirror is aligned with the target point, there is no offset amount between the mirror center and the target point, the position of the target point is not shifted from the mirror center when the target point is to be measured at different positions. Accordingly, as long as the mirror center is capable of being collimated by the total station, it is not necessary to adjust the position of the prism mirror per each of the measurement positions (e.g. situating the prism mirror squarely to the total station), thereby facilitating the position measurement. Further, as long as the mirror center is capable of being collimated by the total station, it is not necessary to situate the prism mirror squarely to the total station at a high place even when the measurement point is set high above the ground, thereby significantly enhancing the workability.

In the measurement jig according to the above arrangement, it is preferable that the prism mirror is attached to the attachment member via a support and is supported by the support in a manner rotatable in a predetermined direction, and a rotation point of the prism mirror is aligned with the mirror center.

With the above arrangement, since the rotation point of the prism mirror is aligned with the mirror center and, consequently, with the target point. Thus, even when the prism mirror is rotated, the positional relationship between the total station, the mirror center, and the target point does not change. Accordingly, when the mirror center is not capable of being collimated by the total station at a first sight, it is only necessary to rotate the prism mirror in a predetermined direction to adjust the prism mirror so that the total station can be collimated at the mirror center. At this time, as long as the mirror center can be collimated by the total station, the prism mirror does not necessarily squarely face the total station, thereby facilitating the position adjustment. Thus, even when the measurement positions are defined over a wide area, the measurement points can be reliably measured by rotating the prism mirror.

In the measurement jig according to the above arrangement, it is preferable that the prism mirror is detachably attached to the support, and the support is provided with an opening through which a contact point between the attachment member and the target member is visible when the prism mirror is detached.

With the above arrangement, whether or not the attachment member and the target member are securely contacted and whether or not the target point and the target member are aligned with each other can be easily checked through the opening.

In the measurement jig according to the above arrangement, it is preferable that the attachment member is provided with a magnet that is configured to be magnetically attached to the target member.

With the above arrangement, the attachment member and, consequently, the whole of the measurement jig can be easily attached to the target member using the magnet, so that an installation work can be rapidly performed.

A measurement jig according to another aspect of the invention is attached to a target member, the measurement jig being used in combination with a total station to measure a position of a target point, the measurement jig including: a prism mirror that is configured to reflect a projected light from the total station; a support that supports the prism mirror; and an attachment member that is configured to attach the support to the target member, the prism mirror being attached to the support in a manner rotatable in a predetermined direction, a mirror center of the prism mirror being aligned with the target point, a rotation point of the prism mirror being aligned with the mirror center, the support being provided with: an opening through which a contact point between the attachment member and the target member is visible when the prism mirror is detached; and an oblong hole elongated in a vertical direction, the support being attached to the attachment member with a bolt inserted through the oblong hole.

With the above arrangement, in addition to the above-described advantages, the position of the support relative to the attachment member can be adjusted using the oblong hole in accordance with a result of the visual check through the opening.

BRIEF DESCRIPTION OF DRAWING(S)

DESCRIPTION OF EMBODIMENT(S)

Exemplary embodiment(s) of the invention will be described below with reference to the attached drawings.

Figure 1:
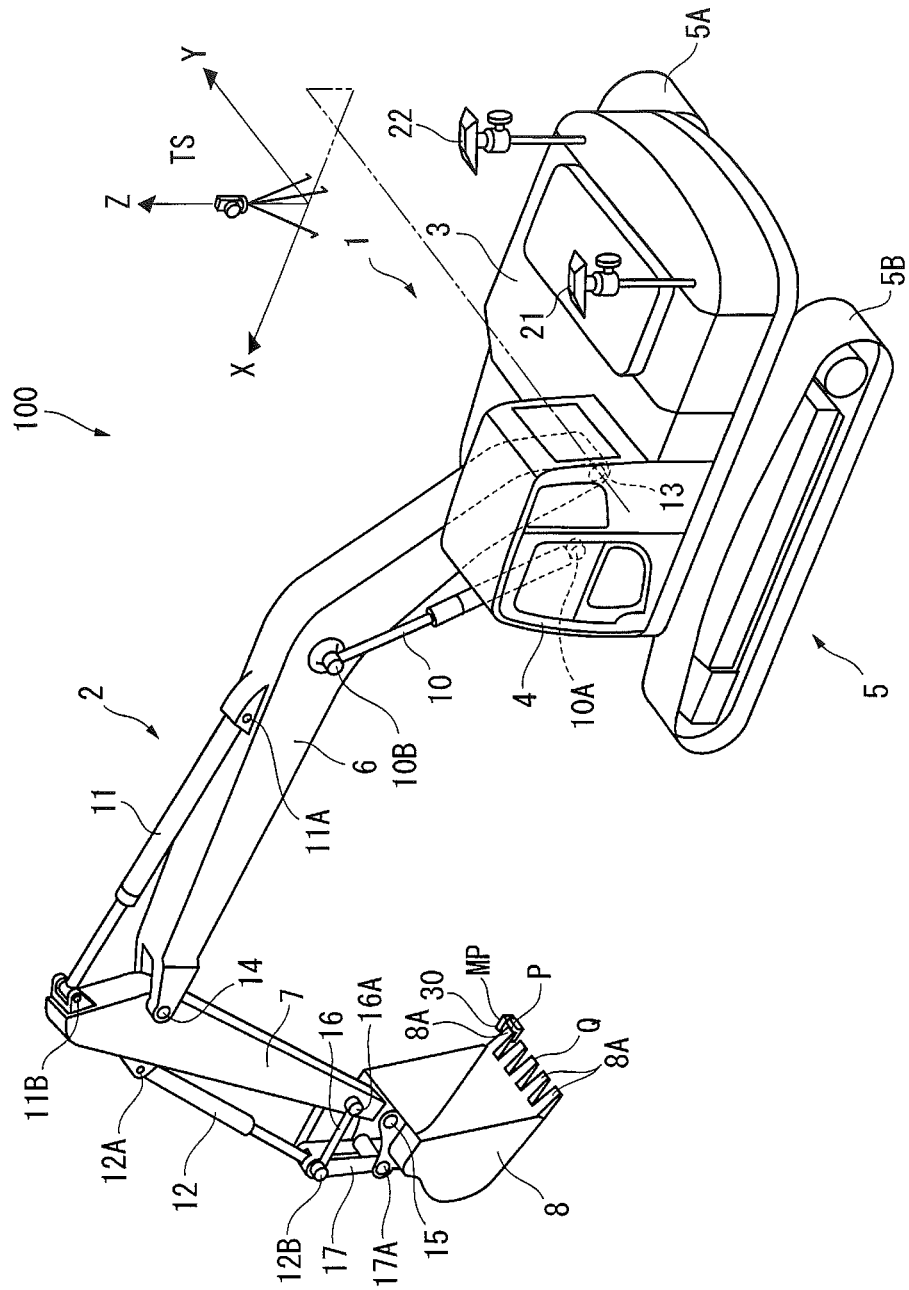
FIG. 1 is a perspective view showing a calibration process performed on a hydraulic excavator attached with a measurement jig according to an exemplary embodiment of the invention.

FIG. 1 shows a hydraulic excavator 100 attached with a measurement jig 30 according to an exemplary embodiment, which is used in combination with a total station TS to perform a calibration work.

Hydraulic Excavator

As shown in FIG. 1, the hydraulic excavator 100 (construction machine) includes a vehicle body 1 and working equipment 2. The vehicle body 1 includes an upper structure 3, a cab 4 and an undercarriage 5. The upper structure 3 is rotatably attached to the undercarriage 5. The upper structure 3 houses therein various components such as an engine and a hydraulic pump (both not shown). Two antennas 21, 22 for RTK-GNSS (Real Time Kinematic-Global Navigation Satellite Systems, GNSS refers to Global Navigation Satellite System) are provided at a rear side of the upper structure 3. The cab 4 is provided at a front side of the upper structure 3. The undercarriage 5 has right and left crawlers 5A, 5B. The hydraulic excavator 100 travels in accordance with a rotation of the crawlers 5A, 5B.

The working equipment 2 is attached to a front side of the vehicle body 1. The working equipment 2 includes a boom 6, an arm 7, a bucket 8, a boom cylinder 10, an arm cylinder 11 and a bucket cylinder 12.

A proximal end of the boom 6 is rotatably attached to the front side of the vehicle body 1 via a boom foot pin 13. In other words, the boom foot pin 13 serves as a rotation center of the boom 6 relative to the upper structure 3.

A proximal end of the arm 7 is rotatably attached to an end of the boom 6 via an arm foot pin 14. In other words, the arm foot pin 14 serves as a rotation center of the arm 7 relative to the boom 6.

The bucket 8 is rotatably attached to an end of the arm 7 via a bucket foot pin 15. In other words, the bucket foot pin 15 serves as a rotation center of the bucket 8 relative to the arm 7.

The boom cylinder 10, the arm cylinder 11 and the bucket cylinder 12 are each a hydraulic cylinder driven by hydraulic pressure. A proximal end of the boom cylinder 10 is rotatably attached to the upper structure 3 via a boom cylinder foot pin 10A. Further, a distal end of the boom cylinder 10 is rotatably attached to the boom 6 via a boom cylinder top pin 10B. The boom cylinder 10 is hydraulically extended and retracted to drive the boom 6.

A proximal end of the arm cylinder 11 is rotatably attached to the boom 6 via an arm cylinder foot pin 11A. Further, a distal end of the arm cylinder 11 is rotatably attached to the arm 7 via an arm cylinder top pin 11B. The arm cylinder 11 is hydraulically extended and retracted to drive the arm 7.

A proximal end of the bucket cylinder 12 is rotatably attached to the arm 7 via a bucket cylinder foot pin 12A. Further, a distal end of the bucket cylinder 12 is rotatably attached to a first end of a first link member 16 and a first end of a second link member 17 via a bucket cylinder top pin 12B. A second end of the first link member 16 is rotatably attached to the distal end of the arm 7 via a first link pin 16A. A second end of the second link member 17 is rotatably attached to the bucket 8 via a second link pin 17A. The bucket cylinder 12 is hydraulically extended and retracted to drive the bucket 8.

A proportional control valve is interposed between the hydraulic cylinders including the boom cylinder 10, the arm cylinder 11 and the bucket cylinder 12, and the hydraulic pump (not shown). The proportional control valve is controlled by a working equipment controller to control a flow rate of hydraulic oil delivered to the hydraulic cylinders 10 to 12, thereby controlling the operations of the hydraulic cylinders 10 to 12.

Calibration Process and Coordinate System

In order to perform an computerized construction, coordinates of a position of a blade edge center Q of the bucket 8 of the hydraulic excavator 100 have to be sequentially detected through calculations. The position of the blade edge center Q refers to a position defined by an intersection of (i) a center line along a longitudinal direction of the boom 6 and the arm 7 and (ii) a line passing an end of one of teeth 8A provided to the bucket 8 and parallel to a rotation axis of the bucket 8. The required parameters for the calculations include: a length of the boom 6 of the hydraulic excavator 100 (i.e. a length from the boom foot pin 13 to the arm foot pin 14); the length of the arm 7 (i.e. a length from the arm foot pin 14 to the bucket foot pin 15); and a length of the bucket 8 (i.e. a length from the bucket foot pin 15 to the blade edge center Q of the bucket 8). The required parameters for the calculations also include a stroke length of the boom cylinder 10, a stroke length of the arm cylinder 11, and a stroke length of the bucket cylinder 12.

These lengths are designed values and thus are not the same as actual lengths due to manufacturing error and assembly error. Accordingly, a target point MP defined near a blade edge P is actually measured at a plurality of measurement positions while changing the attitude of the working equipment 2, and calibration values are calculated based on the position coordinates of the actually measured target point MP and the position coordinates of the target point MP calculated based on parameters, the calibration values being used for calibrating the parameters (calibration process). The total station TS and the measurement jig 30 are used for the actual measurement of the target point MP in the calibration process.

It should be noted that the coordinate system of the coordinates of the construction position to be determined in the computerized construction is a global coordinate system measured by GNSS, which is a coordinate system on the basis of an origin fixedly determined on the earth. On the other hand, the coordinate system of the target point MP (blade edge P) calculated using the parameters of the lengths in the working equipment 2 is a vehicle body coordinate system, which is a coordinate system with an origin thereof at the vehicle body 1 (specifically, the upper structure 3). Further, the coordinate system to be used for the actual measurement of the target point MP in the calibration process is a total station coordinate system, which is a coordinate system on the basis of an origin defined on a ground surface right under the total station TS as shown in FIG. 1.

In the total station coordinate system, a front side of the vehicle body 1 corresponds to face an X axis (plus side), a right side (facing the front side of the vehicle body 1) of the vehicle body 1 corresponds to face a Y axis (plus side) and an upper side of the vehicle body 1 corresponds to face a Z axis (plus side). The total station TS is disposed at a position away from the boom foot pin 13 by a predetermined distance in the X-axis direction, Y-axis direction, and the Z-axis direction.

Accordingly, in order to unify the coordinate systems during the calculation of the calibration values in the calibration process, the coordinates of the position of the target point MP in the total station coordinate system are converted into coordinates in the vehicle body coordinate system and are compared with the coordinates of the calculated position of the target point MP defined in the same vehicle body coordinate system. Further, in order to perform the computerized construction, the coordinates of the sequentially calculated position of the blade edge center Q in the vehicle body coordinate system are converted into the coordinates of the position in the global coordinate system for identifying the construction point and the working equipment 2 is controlled based on the coordinates of the position in the same coordinate system.

The measurement jig 30 to be used in the actual measurement in the calibration process will be detailed below.

Measurement Jig

Figure 2:
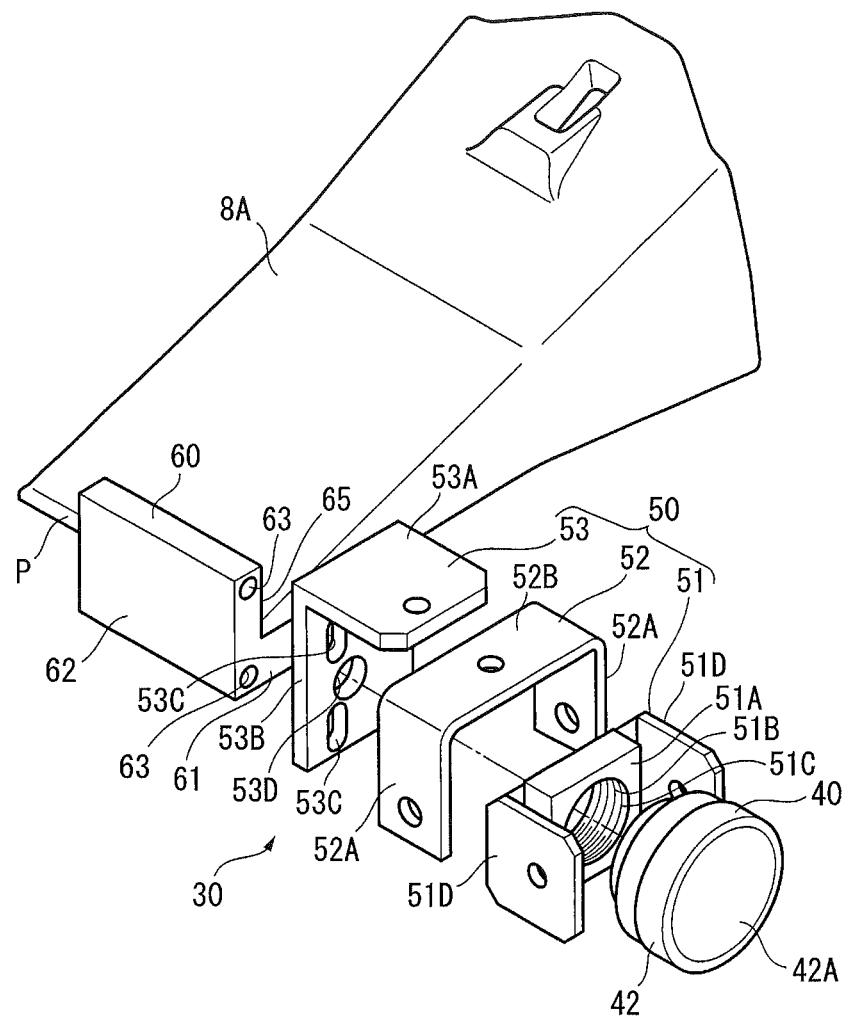
FIG. 2 is an exploded perspective view showing the measurement jig attached to a blade edge of a bucket of the hydraulic excavator.
Figure 3:
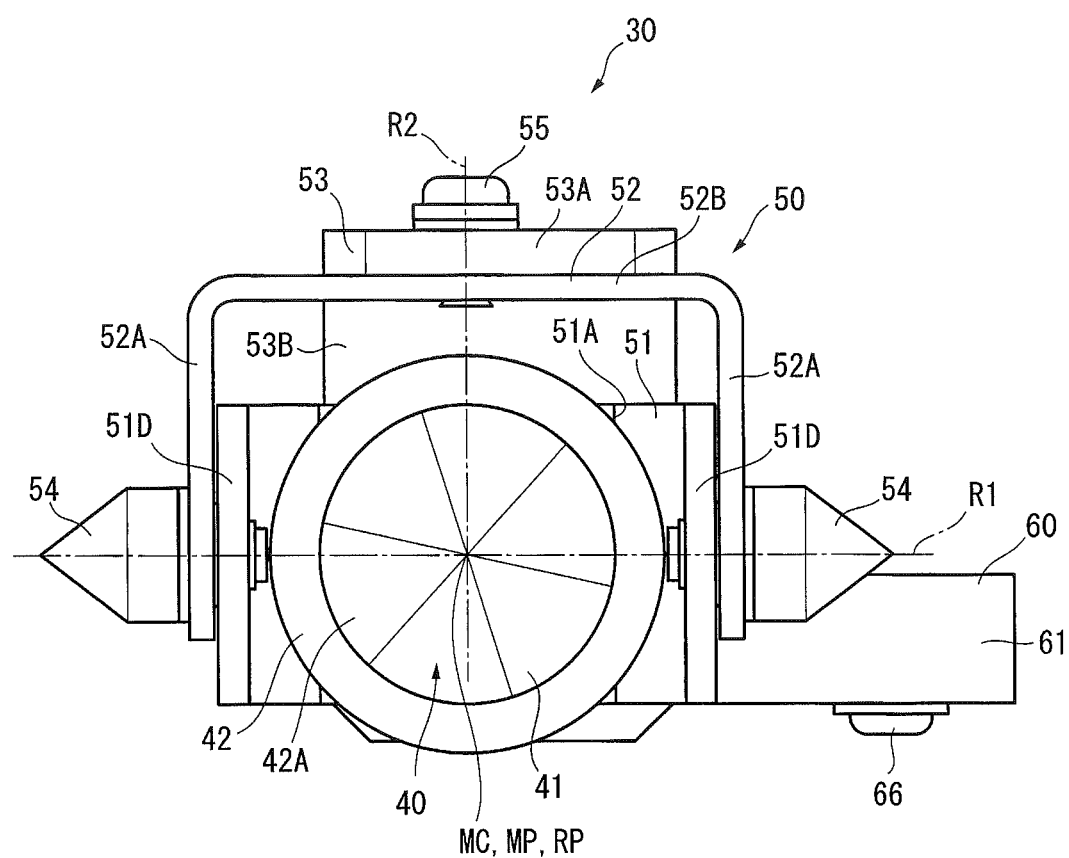
FIG. 3 is a front elevational view showing the measurement jig.
Figure 4:
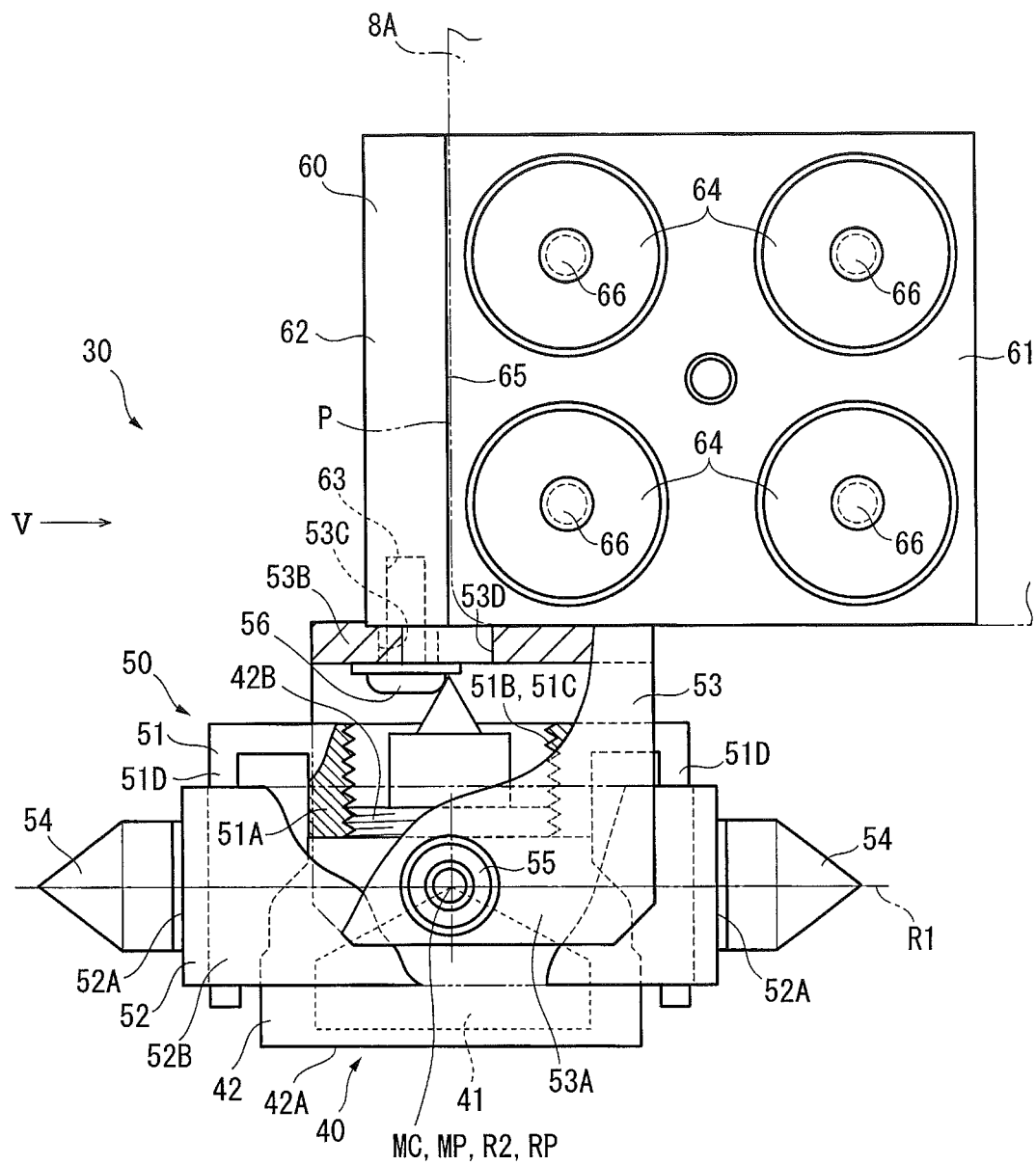
FIG. 4 is a plan view showing the measurement jig.
Figure 5:
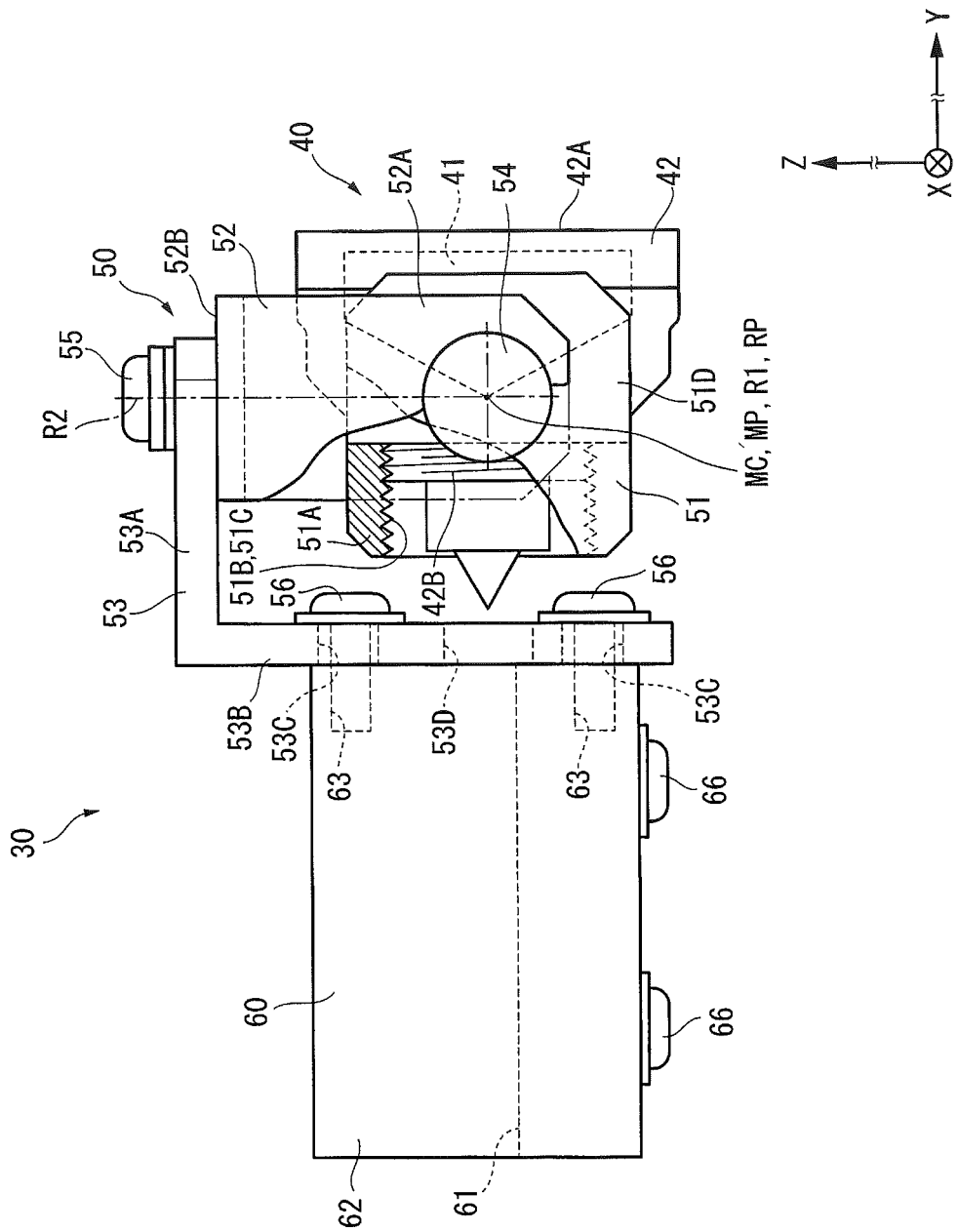
FIG. 5 is a side elevational view of the measurement jig seen in a direction indicated by an arrow V in FIG. 4.

FIG. 2 is an exploded perspective view showing the measurement jig 30 attached to the blade edge P of the bucket 8. FIG. 3 is a front elevational view showing the measurement jig 30 seen from the total station TS. FIG. 4 is a plan view of the measurement jig 30. FIG. 5 is a side elevational view of the measurement jig 30 seen in a direction indicated by an arrow V in FIG. 4.

As shown in FIGS. 2 to 5, the measurement jig 30 is attached to the blade edge (target member) P of the one of the teeth 8A of the bucket 8 closest to the total station TS (in plus-side in the Y-axis direction). A light projected from the total station TS can thus be incident on a prism mirror 40 (described later) of the measurement jig 30 without being blocked. Accordingly, the blade edge P is defined away from the blade edge center Q by a predetermined distance in the Y-axis direction, whereas the positions of the blade edge P and the blade edge center Q are the same in the X-axis and Z-axis directions.

Specifically, the measurement jig 30 includes the prism mirror (referred to simply as a prism hereinafter) 40 that reflects the projected light from the total station TS, a support in a form of an angle adjuster 50 for supporting the prism 40, and an attachment member 60 for attaching the prism 40 to the blade edge P via the angle adjuster 50.

Prism

The prism 40 includes a prism body 41 formed by three prisms combined into a triangular pyramid to define a reflection surface, and an exterior member 42 covering the prism body 41.

A vertex of the triangular pyramid of the prism body 41 defines a mirror center MC at which the total station TS is to be. The mirror center MC is at the same position as the target point MP of the exemplary embodiment. The mirror center MC is a point at which the total station TS is to be collimated during the actual measurement in the calibration process. The target point MP is a point to be measured using the total station TS.

Since the mirror center MC and the target point MP of the prism 40 are at the same position, with no offset amount therebetween as in a typical arrangement, the position of the target point MP is not shifted from the mirror center MC even when the target point is to be measured at different positions.

A circular front side of the exterior member 42 is formed by a transparent glass face 42A. The projected light from the total station TS enters the prism body 41 in the exterior member 42 through the glass face 42A to be reflected at the reflection surface of the prism body 41 and, subsequently, exits through the glass face 42A toward the total station TS in a form of a reflection light. A male screw 42B (FIGS. 4 and 5) is provided on a side of the exterior member 42 opposite the glass face 42A.

Angle Adjuster

The angle adjuster 50 includes a first rotary bracket 51 on which the prism 40 is supported, a second rotary bracket 52 on which the first rotary bracket 51 is supported, and a support bracket 53 on which the second rotary bracket 52 is supported. The angle adjuster 50 defines a universal joint structure as a whole.

The first rotary bracket 51 is in a form of a channel iron opened toward the total station TS in a plan view. A block-shaped support 51A is provided inside the first rotary bracket 51. A support opening 51B penetrating the support 51A in a front-back direction (Y-axis direction) is provided to the support 51A. A female screw 51C is provided on an inner circumferential surface of the support opening 51B. The male screw 42B is screwed into the female screw 51C to support the prism 40 on the first rotary bracket 51 in a detachable manner.

First shaft members 54, 54 penetrating the second rotary bracket 52 are inserted through lateral portions 51D, 51D of the first rotary bracket 51. The prism 40 is supported along with the first rotary bracket 51 by the first shaft members 54 on the second rotary bracket 52 in a manner rotatable around a first rotation axis R1. It should be noted that, though an end of each of the first shaft members 54 is in a form of a cone (i.e. in a stud-like shape), the shape of the first shaft member 54 may be designed otherwise as desired.

The second rotary bracket 52 is in a form of a channel iron opened downward in a front view. Lateral portions 51D, 51D of the first rotary bracket 51 are supported on an inside of lateral portions 52A, 52A of the second rotary bracket 52.

A second shaft member 55 penetrating the support bracket 53 is inserted into the upper portion 52B of the second rotary bracket 52.

The prism 40 is supported along with the first and second rotary bracket 51, 52 on the support bracket 53 by the second shaft member 55 in a manner rotatable around a second rotation axis R2.

As shown in FIGS. 3 to 5, the first rotation axis R1 of the first rotary bracket 51 is parallel to the X axis of the coordinate system shown in FIG. 1 and the second rotation axis R2 of the second rotary bracket 52 is parallel to the Z axis. Accordingly, the prism 40 vertically rotates around the first rotation axis R1 and horizontally rotates around the second rotation axis R2. However, since the relationship between the first and second rotation axes R1, R2 and X and Y axes changes in accordance with an attitude of the working equipment 2, the above does not apply.

The first and second rotation axes R1, R2 intersect with each other at the position of the mirror center MC. Accordingly, the prism 40 rotates around the mirror center MC (i.e. the target point MP) as a rotation point RP. As a result, even when the prism 40 is rotated, the mutual positional relationship between the total station TS, the mirror center MC, and the target point MP does not change.

The support bracket 53 is a reverse L-shaped member in a side elevation and has an upper face 53A on which the upper portion 52B of the second rotary bracket 52 is supported.

The support bracket 53 also has a vertical portion 53B on which a pair of oblong holes 53C that are elongated along a vertical direction (Z-axis direction) are provided. A bolt 56 is inserted into each of the oblong holes 53C. With a use of the bolt 56, the prism 40 is attached to the attachment member 60 in a manner capable of adjusting a vertical position thereof together with the first and second rotary brackets 51, 52 and the support bracket 53.

The vertical portion 53B includes an opening 53D penetrating the vertical portion 53B in a front-back direction (Y-axis direction). A center of the opening 53D, the target point MP and the blade edge P are aligned along the Y axis.

Figure 6:
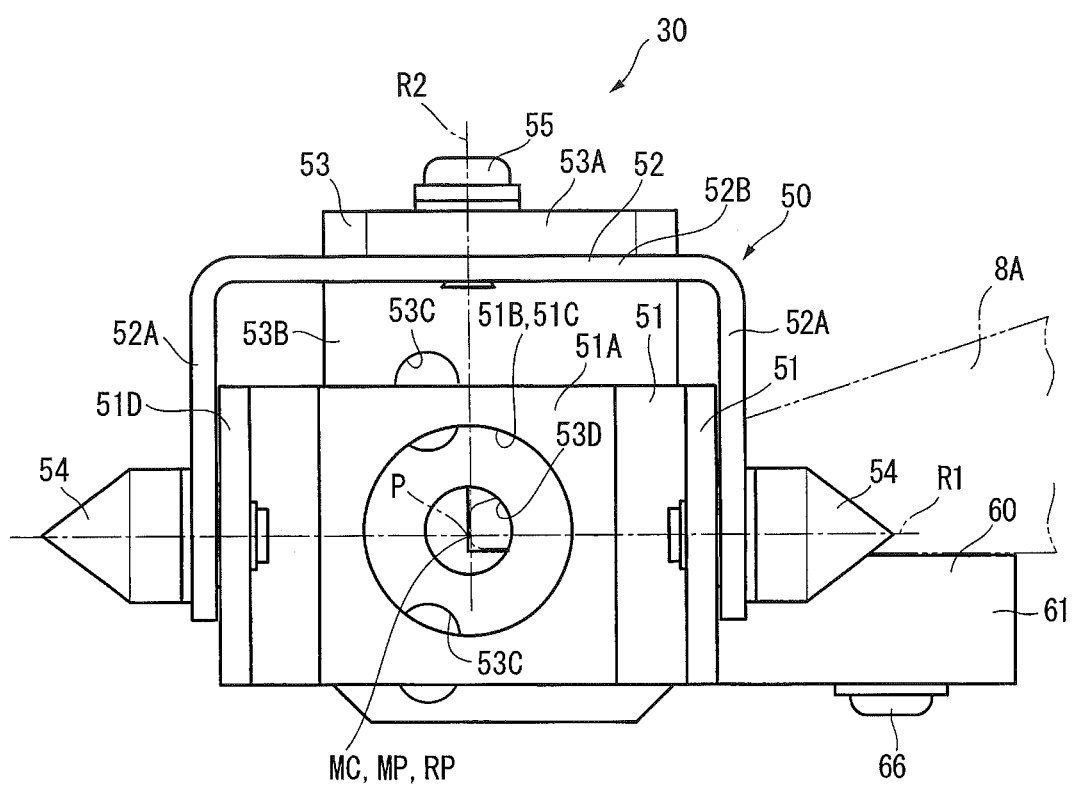
FIG. 6 is a front elevational view showing the measurement jig from which the prism mirror is detached.

As shown in FIG. 6, when the opening 53D is looked into with the prism 40 being detached from the measurement jig 30, it can be checked that the attachment member 60 is in contact with an end of the one of the teeth 8A at the center of the opening 53D. The contact of the attachment member 60 and the end of the one of the teeth 8A at the center of the opening 53D suggests that the blade edge P is not shifted in X-axis direction or Z-axis direction relative to the target point MP. It should be noted that, since the target point MP is shifted only in the Y axis relative to the blade edge P (see FIG. 4), the coordinates of the position of the blade edge P of any kind of the teeth 8A and, consequently, the position of the blade edge center Q can be calculated only by changing the value of the Y coordinate of the position of the target point MP.

Attachment Member

The attachment member 60 is an L-shaped member in a front elevation and has a bottom portion 61 and a vertical face portion 62. A bolt hole 63 for fixing the support bracket 53 of the angle adjuster 50 using a bolt is provided to an end face of the attachment member 60 facing the angle adjuster 50. A plurality of magnets 64 are attached using bolts 66 on an upper surface (i.e. a surface facing a lower surface of the one of the teeth 8A) of the bottom portion 61 of the attachment member 60. The attachment member 60 and, consequently, the whole of the measurement jig 30 can be easily attached to the iron teeth 8A with the magnetic force of these magnets 64.

One of vertical faces of the vertical face portion 62 of the attachment member 60 defines an abutment face 65 to be in contact with the blade edge P of the one of the teeth 8A. The contact status at the abutment face 65 is viewed through the opening 53D.

Actual Measurement Process at Target Point

A measurement process of the target point MP using the total station TS and the measurement jig 30 according to the exemplary embodiment will be briefly described below.

Initially, the total station TS is placed at a position away from the hydraulic excavator 100 by a predetermined distance and the measurement jig 30 with the prism 40 being detached therefrom is attached to the blade edge P. The above predetermined distance is not necessarily strictly determined, but may be roughly determined. Then, looking through the opening 53D of the measurement jig 30, whether or not the blade edge P of the one of the teeth 8A is in contact with the attachment member 60 at the center of the opening 53D is checked. When the one of the teeth 8A is not in contact with the attachment member 60 at the center of the opening 53D, the vertical position of the support bracket 53 relative to the attachment member 60 is adjusted using the oblong hole 53C, or the one of the teeth 8A is securely brought into contact with the abutment face 65 of the attachment member 60 to ensure the contact status.

Subsequently, the working equipment 2 is driven to move the blade edge P to each of a plurality of predetermined measurement positions. Then, the position of the target point MP is measured by the total station TS at each of the measurement positions. Since the mirror center MC of the prism 40 is at the same position as the target point MP in the measurement jig 30 and thus the positional relationship between the mirror center MC and the target point MP does not change even when the blade edge P is moved to each of the measurement positions, the measurement can be uninterruptedly performed without adjusting the position of the measurement jig 30 as long as the mirror center MC can be viewed through the total station TS. The blade edge P may be temporarily moved to a position for a worker to be able to work on the blade edge P only when the mirror center MC cannot be collimated by total station TS as a result of the movement of the blade edge P to each of the measurement positions. Then, after the prism 40 is appropriately rotated to adjust the posture of the prism 40 so that the mirror center MC can be collimated by the total station, the blade edge P may returned again to the measurement position to perform the measurement.

The data of the position coordinates of the target point MP obtained by the actual measurement is outputted to a controller (not shown), and the calibration values are automatically calculated by the controller based on the outputted data.

According to the above-described exemplary embodiment, since the mirror center MC is defined at the same position as the target point MP and thus the position shift of the target point MP relative to the mirror center MC does not occur even at different measurement positions, it is not necessary for the prism 40 to squarely face the total station TS as long as the mirror center MC is capable of being collimated by the total station TS. Accordingly, it is not necessary to adjust the position of the prism 40 each time the measurement point is changed, thereby facilitating the position measurement.

Modification(s)

Incidentally, it should be understood that the scope of the present invention is not limited to the above-described exemplary embodiment(s) but includes modifications and improvements as long as the modifications and improvements are compatible with the invention.

For instance, though the positions of the target point MP and the blade edge P are shifted along the Y axis in the above exemplary embodiment, the positions of the target point MP and the blade edge P may alternatively be shifted along X axis or Z axis. This is because, since the positional relationship between the target point MP and the blade edge P does not change even at different measurement positions, the direction of the position shift of the target point MP and the blade edge P does not cause any disadvantage in calculating the calibration value. It should be understood that the target point MP may be identical with the blade edge P.

Though the angle adjuster 50 includes the first and second rotary brackets 51, 52 and the support bracket 53 in the above exemplary embodiment, the angle adjuster 50 may alternatively have, for instance, a spherical joint structure.

Further, the prism 40 is not necessarily supported by a mechanism such as the angle adjuster 50, but may be rigidly attached to the attachment member 60 so as not to be rotated from a state in which a front face (glass face 42A) of the prism 40 faces in Y-axis direction. With such an arrangement, since the mirror center MC and the target point MP are aligned, an object of the invention can be achieved. However, preferably, the prism 40 should be supported by an angle adjuster with the rotation point RP, the mirror center MC and the target point MP being aligned so that the target point MP can reliably measured irrespective of a position shift of the measurement positions over a wide area as described in the exemplary embodiment.

The invention claimed is:

1. A measurement jig attached to a target member, the measurement jig being used in combination with a total station to measure a position of a target point, the measurement jig comprising:
    a prism mirror that is configured to reflect a projected light from the total station; and
    an attachment member that is configured to attach the prism mirror to the target member,
    a mirror center of the prism mirror being aligned with the target point, wherein
    the prism mirror is attached to the attachment member via a support, is supported by the support in a manner rotatable in a predetermined direction, and is detachably attached to the support,
    a rotation point of the prism mirror is aligned with the mirror center, and
    the support is provided with an opening through which a contact point between the attachment member and the target member is visible when the prism mirror is detached.

2. The measurement jig according to claim 1, wherein the attachment member is provided with a magnet that is configured to be magnetically attached to the target member.

3. A measurement jig attached to a target member, the measurement jig being used in combination with a total station to measure a position of a target point, the measurement jig comprising:
    a prism mirror that is configured to reflect a projected light from the total station;
    a support that supports the prism mirror; and
    an attachment member that is configured to attach the support to the target member,
    the prism mirror being attached to the support in a manner rotatable in a predetermined direction,
    a mirror center of the prism mirror being aligned with the target point,
    a rotation point of the prism mirror being aligned with the mirror center,
    the support being provided with: an opening through which a contact point between the attachment member and the target member is visible when the prism mirror is detached; and an oblong hole elongated in a vertical direction,
    the support being attached to the attachment member with a bolt inserted through the oblong hole.

* * * * *